United States Patent [19]

Loder et al.

[11] 4,049,483

[45] Sept. 20, 1977

[54] PRESSURE SENSITIVE HOT-MELT ADHESIVE SYSTEM

[75] Inventors: Harry A. Loder, Woodbury; Charles A. Mathna, St. Paul, both of Minn.

[73] Assignee: Minnesota Mining and Manufacturing Company, St. Paul, Minn.

[21] Appl. No.: 742,743

[22] Filed: Nov. 18, 1976

[51] Int. Cl.$^2$ ............................................. B32B 27/06
[52] U.S. Cl. .................................. 156/230; 156/332; 260/31.2 R; 428/147; 428/349; 428/355; 526/307
[58] Field of Search ............... 428/144, 147, 306, 307, 428/327, 347, 349, 355, 354, 352; 156/230, 332; 526/307; 260/31.2 R

[56] References Cited

U.S. PATENT DOCUMENTS

| | | | |
|---|---|---|---|
| 3,663,269 | 5/1972 | Fischer et al. | 428/355 |
| 3,691,140 | 9/1972 | Silver | 260/31.2 R |
| 3,857,731 | 12/1974 | Merrill, Jr. et al. | 526/307 |
| 3,865,770 | 2/1975 | Blake | 428/355 |

*Primary Examiner*—William J. Van Balen
*Attorney, Agent, or Firm*—Cruzan Alexander; Donald M. Sell; Gerald F. Chernivec

[57] ABSTRACT

A hot melt adhesive system which has pressure-sensitive adhesive characteristics at room temperature comprising a heat-activatable hot melt adhesive containing therein inherently tacky elastomeric copolymer microspheres.

9 Claims, No Drawings

PRESSURE SENSITIVE HOT-MELT ADHESIVE SYSTEM

BACKGROUND OF THE INVENTION

This invention relates to a hot melt adhesive system which, while retaining conventional hot melt heat activatable bonding characteristics also displays pressure-sensitive adhesive characteristics at ordinary room temperature.

Hot melt adhesive systems are currently being utilized to provide a substantially permanent bond between an article and a substrate. In particular, such a class of adhesives can be utilized where high strength of bonding is desirable, or even critical, to the particular application. Such applications include articles such as plastic sheeting which are to be laminated to a substrate, decorative or functional hardware applied to an item, or non-rigid photographs and art materials which are mounted on substrates so as to provide a rigid, permanent mounting therefor. Such adhesive systems, while affording a substantially permanent bond, do not allow for the temporary positioning of the item, e.g., a photograph, to insure exact placement or registration thereof on the substrate prior to permanent bonding. This is because conventional hot melt systems do not have ambient temperature tack or adhesion, i.e. pressure-sensitive characteristics.

One typical hot melt system for mounting items such as art work involves the utilization of a fibrous paper which has been impregnated with a hot melt adhesive, the paper then being inserted between the particular art work and a mounting substrate prior to bonding. Such hot melt tissues do not provide an ultimate user with an appropriate method of obtaining a positionable temporary bond prior to the achievement of a heat-activated permanent bond, which can thereby result in unacceptable misalignment of mounted articles. In most cases, it is not possible to correct such errors without damaging the art work in some fashion.

Positionable adhesives have been developed which are based upon a high tack pressure-sensitive adhesive layer. The adhesion level is reduced to provide positionability by the incorporation therein of microscopic frangible glass bubbles on both adhesive surfaces. Mounting is achieved after desired positioning of the article to the receptor surface upon the application of pressure to break the glass bubbles, thereby bringing full contact of the aggressively tacky adhesive layer to the surfaces of the article and receptor material. However, such pressure-sensitive adhesives, by their very nature produce bonds which are substantially lower in creep resistance and ultimate shear strength than those produced by typical hot melt adhesives. For this reason, such adhesive systems are unacceptable for heavy duty applications, such as large display photo or art work mountings, or general industrial fastening uses.

One bonding film displaying pressure sensitive characteristics at room temperature, but which is capable of providing a heat-activatable permanent bond, is disclosed in U.S. Pat. Nos. 3,326,741 and 3,753,755. The adhesive system described therein has sufficient room temperature tack to allow formation of a temporary bond, sufficient to hold structures to be united in a fixed position, and thereafter to be heat cured to a strong permanent bond. However, the system is limited to thermosetting resins in attaining the ultimate bond strength.

A mildly pressure-sensitive adhesive system in microspherical form which exhibits a modest degree of room temperature tack has been disclosed in U.S. Pat. No. 3,691,140. More recently, in U.S. Pat. No. 3,857,731, such an adhesive is disclosed in conjunction with a binder to produce a repeatedly usable pressure-sensitive sheet material. Such a sheet material has utility in the temporary mounting of articles where a low level of adhesion, with repetetive application capability, are the primary features. An example thereof is an adhesive-surfaced bulletin board presenting a tacky surface from which objects can be repeatedly adhered to and removed from. Such an adhesive system is not designed to provide a substantially permanent high strength bond.

It has now been found that an adhesive product can be prepared having positionable pressure-sensitive tack, which upon heat activation can undergo a transformation to form a substantially permanent high strength hot melt bond. Such a system can be prepared by the utilization of the aforementioned microspherically-shaped adhesive in conjunction with many conventional hot melt adhesive systems.

SUMMARY OF THE INVENTION

In accordance with the invention there is provided a hot melt adhesive at room temperature comprising a heat-activatable hot melt adhesive and inherently tacky elastomeric copolymer microspheres. Preferably, the adhesive system also contain a tackifying agent capable of increasing the pressure-sensitive characteristics of the microspherical portion. This will allow for the adhesive, when present as a film on a release liner, to effectively be transferred to a receptor at ordinary room temperatures. This receptor can then be positionably mounted on a second receptor prior to permanent bonding thereto by heat activation of the adhesive system.

DETAILED DESCRIPTION OF THE INVENTION

It has been ascertained that the adhesive microspheres disclosed in the aforementioned U.S. Pat. No. 3,691,140 will retain their spherical structure and disperse throughout, and most importantly at the air interface of, a hot melt adhesive matrix. Furthermore, it has been surprisingly discovered that the basic properties of the hot melt matrix are unaffected by the inclusion therein of the microspherical adhesive. This is apparently true because the microspheres and the hot melt matrix are present at a macroscopic level, i.e. they are physically and mechanically mixed, thereby leaving the interstices of the matrix of the hot melt adhesive unaffected, and therefore no basic chemical modification of the hot melt matrix itself occurs.

Upon further investigation of the above phenomenon, it was determined that hereinafter described tackifying resins, when used in combination with the aforementioned dispersion of discrete and suspended microspheres in a hot melt matrix, would in fact enhance the room temperature adhesion of the adhesive surface, without detriment to, and in some instances with improvement of, the heat-activated hot melt bond strength. Such susceptibility to modification by such tackifying resins was found to increase the scope of practical application of the invention, for example by making it possible to provide a sufficiently high surface adhesion to the system to effectively allow a transfer of a discrete film layer of the adhesive, at room temperature, to an article from, e.g., a release transfer paper. Such a property would provide a convenient means of applying the adhesive, in film form, to an article, which was then to be mounted permanently onto a second surface. Once heat-activated, the adhesive would form a substantially permanent high strength hot melt bond.

The tacky microspheres useful in the invention are those produced according to the aforementioned U.S. Pat. No. 3,691,140, incorporated herein by reference. Preferably, the microspheres contain about 95 to 99 weight percent acrylate monomer and about 5 to 1 weight percent ionic monomer, maleic anhydride, or a mixture thereof.

The normally tacky and elastomeric copolymer spheres are typically small in size, having diameters in the range of about 1 to 250 microns, with the majority of the spheres falling in the diameter range of about 5 to about 150 microns.

The acrylate ester portion of the microspheres consists of those monomers which are oleophilic, water-emulsifiable, substantially water-insoluble, and which, as homopolymers, generally have glass transition temperatures below about 20° C. Exemplary monomers are iso-octyl acrylate, 4-methyl-2-pentyl acrylate, 2-methyl butyl acrylate, and sec-butyl acrylate.

The ionic monomer portion of the microspheres consists of those monomers which are water-soluble and substantially oil-insoluble, these terms as defined in the aforementioned U.S. Pat. No. 3,691,140. Exemplary monomers include trimethylamine methylacrylimide, trimethylamine p-vinyl benzimide, ammonium acrylate, sodium acrylate, N.N-dimethyl-N-1-(2-hydroxypropyl)amine methylacrylimide, 4,4,9-trimethyl-4-azonia-7-oxo-9-oxa-9-decene-1-sulfonate, 1,1-dimethyl-1-(2,3-dihydroxypropyl) amine methacrylimide, and maleic anhydride.

The microspheres can be prepared by an aqueous suspension polymerization technique utilizing anionic emulsifiers in an amount greater than the critical micelle concentration, and without addition of protective colloids, finely divided organic solids, or the like. Critical micelle concentration is defined as that minimum emulsifier concentration necessary for the formation of micelles. This concentration is slightly different for various emulsifiers, with useable concentrations ranging from about $1.0 \times 10^{-4}$ to about 3.0 moles per liter. Non-ionic emulsifiers may be utilized so long as an anionic emulsifier is present and predominates.

Catalysts for effecting polymerization of the monomers to their spherical, tacky configuration are those which are normally suitable for free-radical polymerization of acrylate monomers and which are oil-soluble, and are of very low solubility in water, such as, for example, benzoyl peroxide. Catalyst concentration should be high enough to avoid possible agglomeration of the spheres, yet should not be so high as to promote the formation of low molecular weight polymer which does not exhibit all the desired properties. Concentrations of from about 0.15 to about 0.6 percent by the weight of the total suspension, and preferably about 0.25 to 0.45 weight percent, will generally provide a suitable polymer product.

In conjunction with a water soluble or dispersible hot melt matrix, the aqueous suspension of microspheres may be utilized immediately following polymerization, because the suspension is stable to agglomeration or coagulation under room temperature conditions. Alternatively, the suspension may be coagulated with methanol, saturated salt solutions, or the like, followed by washing and drying. These dried polymer spheres, with sufficient agitation, will readily suspend in a variety of common organic solvents, such as ethyl acetate, tetrahydrofuran, heptane, 2-butanone and other ketones, benzene, cyclohexane, esters, and isopropanol and higher alcohols. Highly polar solvents such as water, methanol, and ethanol should be avoided once the spheres are dried, as the spheres will not form suspensions in such solvents.

The hot melt matrix useful in the invention in reality provides three separate functions; the first is to provide a high internal strength film-forming media; secondly to provide a vehicle for the dispersion of the tacky microspherical adhesive; and thirdly to provide the requisite heat-activated hot melt high strength bond between the article to be bonded and the desired receptor. Accordingly, the hot melt matrix should be one capable of providing an integral film, with the microspheres suspended therein. The discrete microspheres must be evidenced throughout the hot melt matrix, and particularly at the adhesive film surfaces, to provide the positionable tack for the article to be bonded prior to heat activation. Because of this necessity of retention of the integrity of the microspheres, the hot melt adhesive should be substantially incompatible with or inert toward the microspheres, i.e. mechanical interaction therewith or solvation therein should be avoided.

If a water-based system is desired, the hot melt should be water soluble or dispersible; similarly with a solvent-based system. Alternatively, a 100 percent solids system can be utilized in conventional hot melt processing techniques, i.e. wherein the material is capable of flowing at an elevated temperature below the degradation temperature of the adhesive components.

Conventional hot melt systems utilizable in the invention include polyesters, polyamides, ethylene-vinyl acetates, styrene-containing block copolymers, acrylics, etc.

It has been found desirable and preferable to incorporate selected tackifiers into the described hot melt microsphere adhesive system to increase ambient temperature adhesion and, in some instances, increase the heat-activated hot melt bond strength. It has been ascertained that the tackifier, because of solubility or compatibility characteristics with the microspherical adhesive, actually increases the tack of the microspheres. The tackifying material apparently penetrates or is absorbed by the microspheres. In some instances it would appear that the tackifier is affecting both the suspended microspheres and the hot melt matrix i.e., the strength of the hot melt bond is increased.

The tackifier component must be capable of increasing the ambient temperature adhesion, i.e. the positionable tack, of the microsphere hot melt matrix combination, and must therefore be compatible with the microspheres, i.e. soluble therein or absorbed thereby. Exemplary compounds capable of increasing the positionable tack of the hot melt matrix-based adhesive system include ester resins, rosin acids, terpene resins, hydrocarbon resins, etc.

The tackifier must of course be soluble in a common coating solvent with the hot melt portion of the adhesive if the adhesive system is to be coated from solution onto a web. In the event of a conventional hot melt system, wherein the material is applied onto a web at 100 percent solids through use of heat, this solubility characteristic is not necessary, but the tackifier in this case should not be degradable at the hot melt flow temperature.

To provide a system exhibiting optimal characteristics, the ratios of the various components must be controlled. Systems containing excessive concentration of the basic hot melt matrix will form the desired high strength heat-activated bond, but the correspondingly low concentration of microspheres will not develop sufficient pressure-sensitive tack. Conversely, if an excessively high ratio of microspheres to hot melt polymer is formulated, so as to provide adequate positionable pressure-sensitive adhesion values, the permanent heat-activated bond strength may be considerably reduced due to interference with film formations of the hot melt. If, however, selected tackifying resins are added to the system, a useful pressure-sensitive tack is achieved without loss to the permanent high strength heat-activated bond.

In general, the adhesive composition should contain from about 10 to about 75 percent by weight of the hot melt component, with from about 90 to about 25 percent by weight being the tackified microsphere portion. Of the latter, the microspheres themselves should comprise from about 15 to about 75 percent by weight, the balance being the tackifying agent therefor.

In order to impart positionable tack to an adhesive film of the invention the film preparation must be controlled such that the microspheres can protrude from the matrix surface. This can be accomplished by controlling coating thickness, matrix density, solution viscosity, and/or by selection of the proper solvent system. A film coating having a dried thickness less than the diameter of the microspheres will insure that the microspheres will protrude from the surface. If a thicker film is desired, a matrix with a density greater than that of the microspheres will allow positionable pressure-sensitive properties at the film surface. Viscosity of the solution can also play an important role, in that the microspheres should be able to float to the surface. Criteria for selection of a solvent system are that the hot melt matrix and tackifier must be completely soluble therein and the microspheres must be capable of being dispersed uniformly therethrough. Therefore, solvent systems containing highly polar solvents should be avoided.

In order for 100% solids hot melt coating to be successful, the microspheres must be capable of uniformly dispersing throughout the hot melt matrix and cannot be soluble therein. Generally, it is preferred to use matrices with specific gravities greater than that of the microspheres, and low viscosities, as much matrices will allow the microspheres to in essence float to the surface. Film thickness should be controlled to insure a higher concentration of microspheres at the air/adhesive interface.

This hot melt adhesive system of the invention can be applied to many substrates, i.e. films and papers, by conventional means. For example, the adhesive may be coated to a desired thickness using, e.g., knife, wire wound rod, etc., or conventional hot melt coaters, or can be brushed onto various substrates.

The adhesive system has generally utility in those applications where accurate positioning of an article on a substrate is critical, and where a high bond strength typical of hot melt adhesives is desired. It is also useful in effecting smooth and bubble-free laminations of films, papers, foils, etc. to substrates. Of particular interest is the case where this adhesive system is coated onto a release liner. By the appropriate combination of adhesive and release liner, such an arrangement can offer a convenient means of transferring a uniform layer of the adhesive to an article, which in turn can be positioned onto a second surface and subsequently permanently bonded thereto by heat activation. Such a system is especially useful for mounting photographs and art materials to mounting boards, where direct application of the adhesive to either the article to be mounted or a rigid substrate is not practical.

The invention will now be more specifically illustrated by the following non-limiting examples, wherein all parts are by weight unless otherwise specified.

EXAMPLE 1

In accordance with the teachings of U.S. Pat. No. 3,691,140, a 3-liter indented resin flask fitted with a mechanical stirrer was charged with 410 grams (90 mole percent) of isooctyl acrylate, 38 grams (10 mole percent) of trimethylamine methacrylimide, 1500 milliliters of deoxygenated distilled water, and 20 grams of alkylarylpolyethylene oxide sodium sulfonate (commercially available from the Rohm and Haas Company under the trade designation "Triton X-200"). The flask was purged with nitrogen, 1.5 grams of benzoyl peroxide added, and the mixture heated to 66° C. and stirred vigorously (at about 500 rpm) for 20 hours at 66° C. under nitrogen.

At the end of the 20 hours, the suspension was cooled to 20° C. and filtered through cheesecloth to remove agglomerates, the solid polymer being recovered by coagulation and washing with methanol to provide a 95-98 percent yield of discrete microspheres ranging in diameter from about 10 to about 150 microns. The microspheres were dispersed in methylethylketone to provide an 8.8 percent by weight dispersion thereof.

A solution was then prepared by mixing 6.3 parts by weight of Formal-85 (tradename for a hydrogenated ester resin commercially available from the Hercules Chemical Company), 6.3 parts of methylethylketone, and 85.4 parts of the microsphere dispersion.

A segmented polyester thermoplastic adhesive was prepared by first fitting a 3-neck flask with a mechanical stirrer, a Dean-Starke trap-condenser, and a thermometer, a gas inlet also being available for maintaining an inert atmosphere within the flask. The following were then charged to the flask:

24.9 parts adipic acid
24.3 parts hydrogenated dilinoleic acid
29.4 parts 1,4-cyclohexanedimethanol
21.4 parts poly(oxytetramethylene)glycol (2000 molecular weight)

An inert gas was introduced into the flask and the contents thereof brought to 170° C by means of a heated oil bath. The mixture was stirred and held at this temperature for three hours, during which time the water resulting from condensation was collected in the trap. The pressure was reduced to about 0.25 mm Hg and these conditions maintained for 30 minutes to remove any additional volatile material. The vacuum was broken with nitrogen and 0.1 part of tetrabutyltitanate catalyst was added. The temperature was then increased to 220° C and the pressure reduced to 0.15 mm Hg and these conditions maintained for approximately four hours. The reaction product was then poured and scraped from the flask using a heat gun to keep the product hot enough to flow. The polymer obtained solidifies to a tough, flexible, and colorless material.

A solution of this thermoplastic adhesive was prepared by mixing 25.0 parts of the adhesive with 75.0 parts of toluene.

The two solutions were then mixed on a basis of 64.1 parts of the first solution and 35.9 parts of the second solution, thereby providing a mixture of approximately 27.5 weight percent microspheres, 22.5 weight percent Foral-85, and 50.0 weight percent of the polyester adhesive.

To ascertain the cohesive strength of the adhesive pursuant ASTM D-3164, the adhesive was knife coated at a 4 mil orifice onto a 60 pound silicone coated linear paper and allowed to air dry at room temperature for 16 hours, providing a dry coating weight of 13.0 grams per square meter. By burnishing, a ½ inch by 6 inch adhesive sample was transferred from the liner paper to a 7 mil polyethylene terephthalate film. A second 7 mil polyethylene terephthalate film was lapped over the adhesive, the overlap being ½ inch. The samples were then slit to 1 inch by 7½ inch sheets and the outer two discarded as per ASTM D-3164 specifications. These 1 inch by 7½ inch samples were then heated for two minutes in a commercially available photomounting machine from Seal Incorporated sold under the trade designation Seal Commercial 210 Mounting Press set at 200° F and the manufacturer's preset pressure setting for photomounting applications. The samples were then allowed to stabilize in a 50% relative humidity, 70° F room for 16 hours. To test the cohesive strength, a conventional Instron tensile tester was used. Crosshead speed was one inch per minute, jaw separation was 6 inches, and a 200 pound load cell was used. The force to pull the sample apart was recorded as the cohesive strength of the adhesive. This was determined to be 136 pounds per square inch.

To determine the pressure sensitive adhesion of the adhesive pursuant ASTM D-903, the adhesive was knife coated at a 4 mil orifice onto a 1.3 mil polyethylene terephthalate film and allowed to air dry at room temperature for 16 hours, providing a dry coating weight of 14.7 grams per square meter. The coated film was then cut to 1 inch by 12 inch samples, the 12 inches being in the machine direction. These samples were then adhered to a stainless steel plate by rolling them down with four passes of a 4.5 pound roller. The plate was then clamped into the lower jaw of a conventional Instron and the end of the adhesive sample closest to the lower jaw was turned back and clamped in the upper jaw. The film was then peeled at an angle of 180° from the stainless steel plate at a rate of 10 inches per minute. The adhesion was recorded as 14 grams per inch.

EXAMPLE 2

A microsphere/tackifier solution was prepared as per Example 1, and a second solution was prepared by mixing 10.0 parts of Elvax-150, tradename for an ethylene/vinyl acetate adhesive commercially available from the DuPont Company, with 90.0 parts of toluene. The two solutions were mixed in the ratio of 41.7 parts of the microsphere solution with 58.3 parts of the second solution to thereby provide approximately 27.5 weight percent microspheres, 22.5 weight percent Forcel-85 and 50.0 percent Elvax-150.

The solution was coated as per Example 1 to provide dry coating weights of 8.0 and 9.6 grams per square meter on the silicone liner and polyester web, respectively. The cohesive strength, when tested as per Example 1, was determined to be 96 pounds per square inch while the pressure sensitive adhesion was determined to be 17 grams per inch.

EXAMPLE 3

A solution was prepared by mixing 5.25 parts of Nelio-N, tradename for a rosin ester commercially available from the Union Camp Company, with 89.5 parts of the methylethylketone/microsphere dispersion of Example 1, and 5.25 parts of methylethylketone. A second solution was prepared by mixing 25.0 parts of the thermoplastic adhesive of Example 1 with 75.0 parts of toluene. The two solutions were then mixed on a basis of 65.6 parts of the microsphere solution and 34.4 parts of the thermoplastic adhesive solution, the mixture thus containing, on a total solids basis, approximately 30.0 percent microspheres, 20.0 percent Nelio-N, and 50.0 percent of the thermoplastic adhesive.

The solution was coated and tested as per Example 1, wherein the dry coating weights were 13.0 and 14.2 grams per square meter on the silicone liner and polyester web respectively. The cohesive strength was found to be 80 pounds per square inch while the pressure-sensitive adhesion was 19 grams per inch.

EXAMPLE 4

A microsphere/tackifier solution was prepared as per Example 3 with the exception that Newport-S, tradename for a terpene resin commercially available from the Heyden-Newport Corporation, was substituted for the Nelio-N. A second solution was prepared as per Example 3, the two solutions then being mixed in the same proportions as Example 3. When coated and tested as per Example 1, the cohesive strength was 133 pounds per square inch while the pressure sensitive adhesion was 20 gram per inch.

EXAMPLE 5

An adhesive solution was prepared as per Example 1 with the exception that National Starch 1080, tradename for a styrene block copolymer-based hot melt adhesive commercially available from the National Starch Company, was substituted for the segmented polyester thermoplastic adhesive. When coated and tested as per Example 1, the cohesive strength was found to be 112 pounds per square inch while the pressure-sensitive adhesion was determined to be 17 grams per inch.

EXAMPLE 6

An adhesive solution was prepared in accordance with Example 2 with the exception that Piccotex, tradename for a pure monomer hydrocarbon resin commercially available from the Hercules Corporation, was substituted for the Foral-85, and Elvax-40, tradename for an ethyhlene-vinyl acetate hot melt polymer commercially available from the DuPont Company, was substituted for the Elvax-150.

Upon coating as per Example 1, dry coating weights on the silicone liner and polyester web were 6.7 and 8.4 grams per square meter, respectively. Cohesive strength was measured at 71 pounds per square inch and the pressure sensitive adhesion was 12 grams per inch.

EXAMPLE 7

A microsphere/adhesive solution was prepared as per Example 1 with the exception that Isoterp-95, tradename for a polyterpene resin commercially available from the Schnectady Chemical Company, was substituted for the Foral-85, and Kraton-1107, tradename for a styrene-isoprene-styrene block copolymer, commercially available from the Shell Chemical Company, was substituted for the polyester thermoplastic adhesive. When mixed in accordance with the percentages of Example 1 and coated, the dry coating weights were 12.6 and 15.5 grams per square meter on the silicone liner and polyester web, respectively. When tested, the material was found to fail adhesively at 48 pounds per square inch, and the pressure sensitive adhesive was 15 gams per inch.

EXAMPLE 8

A solution was prepared by mixing 67.5 parts of Eastman WD Size, tradename for a 30 percent solids by weight dispersion of a water soluble polyester hot melt commercially available from Eastman Chemical Company, 13.5 parts of a 50 percent solids aqueous dispersion of microspheres, and 6 parts of Gantrez M-154, tradename for a 50 percent by weight dispersion of polyvinylmethylether in water commercially available from General Analine and Film Corporation. This mixture thus contained 67.5 percent by weight of the hot melt, 22.5 percent microspheres and 10 percent polyvinylmethylether. The adhesive was coated onto the silicone liner and 1.3 mil polyethylene terephthalate web using a 2 mil orifice and was dried at 200° F for 10 minutes, then allowed to stabilize at room temperature for 16 hours. Coating weight on the silicone liner was 13.0 grams per square meter and the coating weight on the 1.3 mil polyethylene terephthalate web was 15.1 grams per square meter. The cohesive strength was measured as 136 pounds per square inch while the pressure sensitive adhesion was measured at 19 gram per inch.

EXAMPLE 9

A mirosphere/tackifier solution was prepared by mixing 6.3 parts by weight of Foral-85, 6.3 parts of methylethylketone and 85.4 parts of an 8.8 percent solids mirospheres dispersion in methylethylketone.

A second solution was prepared by mixing 10 parts of Amsco 211 (tradename for a polyamide hot melt commercially available from Union-Amsco Corporation) and 90 parts of toluene. After mixing on a high speed shaker for 16 hours, the material was filtered and percent solids taken. Final percent solids was determined to be 8.5 percent.

The microsphere-containing solution was mixed with the second solution in a ratio of 37.8 parts by weight to 62.2 parts by weight, respectively, thereby providing approximately 27.5 percent by weight of microspheres, 22.5 percent by weight of Foral-85 and 50 percent by weight of the hot melt matrix. The mixture was coated and tested, as per Example 1, 1 except the coating orifice was 8 mils for both backings. Coating weight on the silicone liner was 15.9 grams per square meter, while that on the polyethylene terephthalate web was 17.2 grams per square meter. The cohesive strength was measured as 147 pounds per square inch while the pressure sensitive adhesion was measured at 6.8 grams per inch.

EXAMPLE 10

A solution was prepared by mixing 63.5 parts Hycar 2671, tradename for a 53.2 percent solids aqueous dispersion of an acrylate hot melt, commercially available from B.F. Goodrich Chemical Company, 26.1 parts of a 50 percent solids aqueous dispersion of microspheres and 10.4 parts of Gantrez M-154, tradename for a 50 percent solids aqueous dispersion of polyvinylmethylether, commercially available from General Analine and Film Corporation. This mixture contained approximately 25 percent by weight of microspheres, 65 percent by weight of Hycar 2672, and 10 percent by weight Gantrez M-154.

The mixture was coated and tested as per Example 1 with the exception that a 2 mil coating orifice was used and drying was undertaken at 200° F for 10 minutes. The dry coating weights were 10.9 and 18.0 grams per square meter on the silicone liner and polyester web, respectively. The cohesive strength was 101 pounds per square inch and the pressure sensitive adhesion was 24.3 grams per inch.

EXAMPLE 11

A hot melt composition was prepared by adding 200 grams of the segmented polyester described in Example 1 and 90 grams of Foral-85 to a 1200 milliliter stainless steel beaker. The beaker was placed in a peanut oil bath at a temperature of between 180° and 200° C to allow the polymers to melt. After completion of the melting, stirring was initiated with a high speed turbine-type mixer for approximately 5 minutes. While stirring was in progress, 200 grams of a 50 percent by weight solids aqueous microsphere dispersion was slowly added to the hot melt. Stirring was continued for approximately 30 minutes after addition of the microsphere dispersion to insure thorough mixing of the microspheres into the hot melt system.

The mixture was then coated on a knife coater which had been heated to 350° F in an oven, the coating orifice being 1 mil. The adhesive was coated onto both a silicone-treated liner paper and a 1.3 mil polyester web. The coatings were allowed to cool overnight, providing a coating weight of 325.2 grams per square meter on the silicone liner and 288.8 grams per square meter on the polyester web. The cohesive strength and pressure sensitive adhesion were measured as per Example 1, whereupon the cohesive strength was found to be 164 pounds per square inch and the pressure sensitive adhesion was measured at 4 grams per inch.

What is claimed is:

1. A hot melt adhesive system having pressure sensitive adhesion at ordinary room temperature conditions which is capable of forming a permanent bond at elevated temperatures comprising a blend of a heat-activatable adhesive, capable of forming a substantially permanent bond at elevated temperatures, said adhesive having dispersed therein discrete tacky elastomeric copolymer microspheres, said microspheres consisting essentially of a. about 90 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and correspondingly b. about 10 to about 0.5 percent by weight of one or more monomers selected from the group consisting of trimethylamine methacrylimide, trimethylamine p-vinyl benzimide, ammonium acrylate, sodium acrylate, N,N-dimethyl-N-(β-methacryloxyethyl-)ammonium propionate betaine, 1,1-dimethyl-1-(2-hydroxypropyl) amine methacrylimide, 4,49-trimethyl-4-azonia-7-oxo-8-oxa-9-decene-1-sulphonate, 1,1-dimethyl-1-(2,3-dihydroxypropyl)amine methacrylimide, and maleic anhydride.

2. The adhesive system of claim 1 wherein said heat-activatable adhesive comprises from about 10 to about 75 percent by weight of said blend and said microspheres comprise about 90 to about 25 percent by weight of said blend.

3. An article comprising a sheet material having a coating on at least one surface thereof, said coating comprising a hot melt adhesive system having pressure sensitive adhesion at ordinary room temperature, said system comprising a blend of a heat-activatable adhesive capable of forming a substantially permanent bond at elevated temperatures, and dispersed therein discrete, tacky, elastomeric copolymer microspheres, said microspheres consisting essentially of
   a. about 90 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and correspondingly
   b. about 10 to about 0.5 percent by weight of one or more monomers selected from the group consisting of trimethylamine methacrylimide, trimethylamine p-vinyl benzimide, ammonium acrylate, sodium acrylate, N,N-dimethyl-N-(β-methacryloxyethyl-)ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1-(2,3-dihydroxypropyl) amine methacrylimide, and maleic anhydride,
said microspheres being dispersed in said heat-activatable adhesive such that at least a portion thereof are present at the surface of said coating.

4. The article of claim 3 wherein said heat-activatable adhesive comprises from about 10 to about 75 percent by weight of said blend and said microspheres comprise about 90 to about 25 percent by weight of said blend.

5. A hot melt adhesive system having pressure sensitive adhesion at ordinary room temperature conditions which is capable of forming a permanent bond at elevated temperatures comprising a heat-activatable adhesive capable of forming a substantially permanent bond at elevated temperatures having dispersed therein a mixture of discrete tacky elastomeric copolymer microspheres and a tackifying agent which is compatible with said microspheres and capable of increasing the tack thereof, said microspheres consisting essentially of
   a. about 90 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and correspondingly
   b. about 10 to about 0.5 percent by weight of one or more monomers selected from the group consisting of trimethylamine methacrylimide, trimethylamine p-vinyl benzimide, ammonium acrylate, sodium p-acrylate, N,N-dimethyl-N-(β-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1-(2,3-dihydroxypropyl) amine methacrylimide, and maleic anhydride.

6. The adhesive system of claim 5 wherein said heat-activatable adhesive comprises about 10 to about 75 percent by weight of said system and said mixture of microspheres and tackifying agent comprise from about 90 to about 25 percent by weight of said system, the microspheres comprising from about 15 to about 75 percent by weight of said mixture.

7. An article comprising a sheet material having an adhesive coating on at least one surface thereof, said coating being comprised of the adhesive system of claim 5 wherein said microspheres are dispersed in said heat-activatable adhesive such that at least a portion thereof are present at the surface of said coating.

8. The article of claim 7 wherein said sheet material has a release coating thereon which is interposed between said sheet material and said adhesive coating.

9. A process comprising the steps of
   a. applying an adhesive coating to a release-coated sheet material, said adhesive coating comprising the adhesive system of claim 5 wherein at least a portion of said microspheres are present at the surface of said adhesive coating;
   b. placing an object on the surface of the adhesive coating and burnishing;
   c. removing said object, whereby said adhesive coating is transferred to said object;
   d. positioning said object on a substrate; and
   e. heating said adhesive system to the heat-activation temperature thereof, whereby a substantially permanent bond is effected between said object and said substrate.

* * * * *